United States Patent [19]

Uede et al.

[11] 4,150,362

[45] Apr. 17, 1979

[54] REGENERATION OF A MEMORY STATE IN ELECTROCHROMIC DISPLAYS

[75] Inventors: Hisashi Uede; Yasuhiko Inami, Tenri; Hiroshi Kuwagaki, Kyoto; Hiroshi Hamada, Tenri; Tadanori Hishida, Kashihara; Hiroshi Nakauchi, Nara, all of Japan

[73] Assignee: Sharp Kabushiki Kaisha, Osaka, Japan

[21] Appl. No.: 817,540

[22] Filed: Jul. 20, 1977

[30] Foreign Application Priority Data

Jul. 26, 1976 [JP] Japan .................................. 51/89342

[51] Int. Cl.² .............................................. G09F 9/32
[52] U.S. Cl. .................................... 340/785; 340/763; 350/357; 340/803
[58] Field of Search ............ 340/324 EC, 324 M, 336; 350/16 OR, 357; 58/50 R

[56] References Cited

U.S. PATENT DOCUMENTS

| 3,987,433 | 10/1976 | Kennedy | 340/336 |
| 4,034,550 | 7/1977 | Kouchi et al. | 350/357 X |
| 4,057,739 | 11/1977 | Otake | 350/357 X |

Primary Examiner—David L. Trafton
Attorney, Agent, or Firm—Birch, Stewart, Kolasch & Birch

[57] ABSTRACT

A drive system is provided for an electrochromic display which includes an electrochromic material, a display pattern electrode and a counter electrode. The electrochromic phenomenon, or, reversible variations in the light absorption properties are developed when a predetermined voltage is applied between the display pattern electrode and the counter electrode. An erase pulse is applied to a bleached state display pattern electrode when a certain display pattern is held for a period longer than a memory period of the electrochromic display in order to regenerate the memory state and enhance the visibility.

2 Claims, 9 Drawing Figures

REGENERATION OF A MEMORY STATE IN ELECTROCHROMIC DISPLAYS

BACKGROUND AND SUMMARY OF THE INVENTION

The present invention relates to a drive system for an electrochromic display containing an electrochromic material held in two electrode carrying support plates, at least one of which is transparent, to manifest reversible variations in the light absorption properties upon current supplied.

The present invention relates, more particularly, to a drive system which regenerates a memory state in an electrochromic display.

An electrochromic material is one in which the color is changed by the application of an electric field or current. See, for example, L. A. Goodman, "Passive Liquid Displays", RCA Report 613258.

There are two types of electrochromic displays (referred to as ECD hereinafter). The first type of ECD includes an inorganic solid film formed on electrodes, which produces color variations by the change in the opacity. The second type of ECD utilizes an electrically-induced chemical reduction of a colorless liquid to produce a colored, insoluble film on a cathode surface.

In such an ECD, memory effects are expected, which maintains the coloration state or the bleached state for several hours through several days as long as ECDs are held in an electrically opened state. However, the memory period is not infinite and, therefore, a colored display electrode is gradually bleached and/or a bleached display electrode is gradually colored when a certain display pattern is held for a period longer than the memory period of ECDs, for example, longer than ten (10) hours. This deteriorates the display quality.

Accordingly, an object of the present invention is to provide an improvement in a drive system for electrochromic displays which can enhance legibility of a visual display provided by the electrochromic displays.

Another object of the present invention is to regenerate a memory state in electrochromic displays.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, when a certain display pattern is desired to be maintained for a time period longer than the memory period of the ECD, all display electrodes are bleached by applying erase pulses and then desired display electrodes are again colored by applying write pulses. In another form, when a certain display pattern is desired to be maintained for a time period longer than the memory period of the ECD, erase pulses are applied to bleached display electrodes in an interval shorter than the memory period of the ECD.

BRIEF DESCRIPTION OF THE DRAWINGS

The present invention will become more fully understood from the detailed description given hereinbelow and the accompanying drawing which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, basic structures of the ECD and the conventional driver circuit will be first described with reference to FIGS. 1 through 4.

Figure 1:
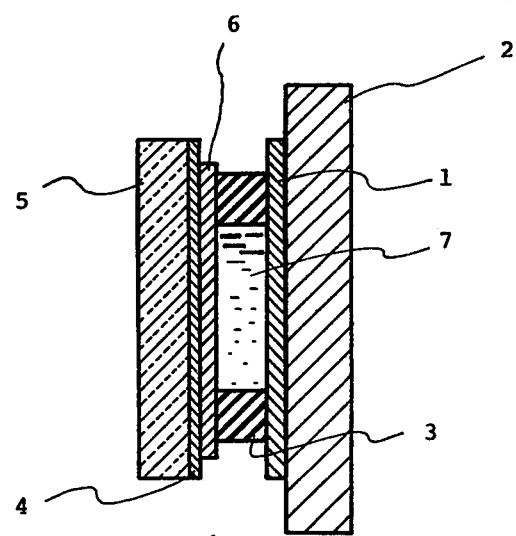
FIG. 1 is a cross sectional view of a basic structure of a solid state ECD.

There are two types of electrochromic displays referred to as ECDs. In one kind, the color variation is produced by the change in the opacity of an inorganic solid film. A typical device structure is shown in FIG. 1, wherein a layer of carbon powder added with binder (registered trademark AQUADAG) is denoted as 1, a stainless plate is denoted as 2. Both the layer 1 and the stainless plate 2 constitute a counter electrode. A spacer is denoted as 3; a transparent electrode is denoted as 4; a glass substrate is denoted as 5; an inorganic solid film which manifests the electrochromic phenomenon is denoted as 6; and an electrolyte is denoted as 7. The inorganic film 6 most commonly used for electrocoloration is $WO_3$ with thickness of about 1 $\mu$m. The electrolyte 7 is a mixture of sulfuric acid, an organic alcohol such as glycerol, and a fine white powder such as $TiO_2$. The alcohol is added to dilute the acid and the pigment is used to provide a white reflective background for the coloration phenomenon. The thickness of the liquid is usually about 1mm. The counter electrode is properly selected for effective operation of the device.

The amorphous $WO_3$ film is colored blue when the transparent electrode is made negative with respect to the counter electrode. The applied voltage is several volts. The blue color is diminished or bleached when the polarity of the applied voltage is reversed. This is termed bleaching.

The coloration of the film apparently is produced by the injection of electrons and protons into the $WO_3$ film. Bleaching occurs because the electrons and protons are returned to their respective starting electrons when the polarity is reversed. The colored state is maintained for several days after removal of the coloration voltage as long as the bleaching voltage is not applied (memory effects).

The second type of ECD utilizes an electrically-induced chemical reduction of a colorless liquid to produce a colored, insoluble film on the cathode surface. In the absence of oxygen, the colored film remains unchanged as long as no current flows. However, the coloration will disappear gradually in the presence of oxygen. This is termed fading. Reversing the voltage causes the film to dissolve into the liquid with the concurrent erasure of the color. The colorless liquid that has met with the most success so far is an aqueous solution of the conducting salt, KBr, and an organic material, heptylviologen bromide, which is the material that produces a purplish film upon electrochemical reduction. Typical voltages are about 1.0VDC.

Figure 2:
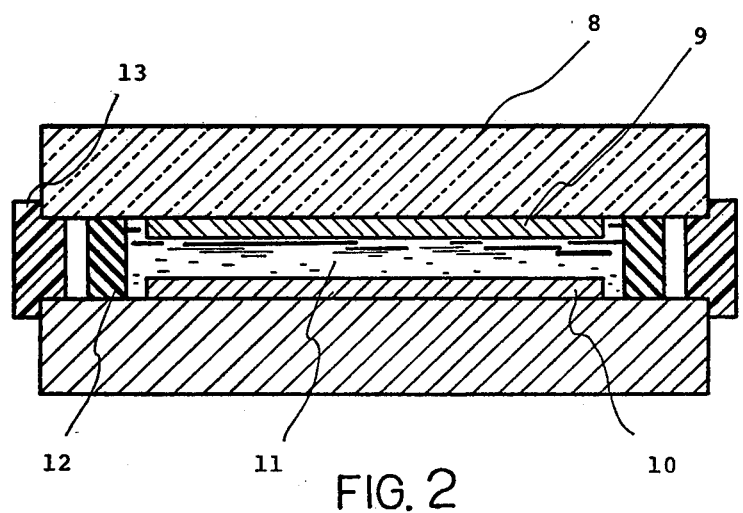
FIG. 2 is a cross sectional view of a basic structure of a liquid state ECD.

The basic cell structure is illustrated in FIG. 2. A glass substrate is denoted as 8; a counter electrode is denoted as 9; display electrodes are denoted as 10; a viologen mixture liquid is denoted as 11; a spacer is denoted as 12; and a sealing material is denoted as 13. The fluid thickness is normally about 1 mm. The viologen-based ECDs can be used in a transmissive mode if both electrodes are transparent or in a reflective mode if a white reflective pigment is mixed in the clear electrochromic liquid.

Although the operating principle of ECDs has been discussed above, ECDs have the following characteristic features:

(1) the viewing angle is extremely wide
(2) a plurality of colors are selectable
(3) for a single cycle of coloration/bleaching the power dissipation is several through several tens $mj/cm^2$, and the total power dissipation is proportional to the number of the repetition cycles
(4) memory effects are expected, which maintains the coloration state for several hours through several days after the coloration voltage is removed as long as ECDs are held in an electrically opened state. Of course, the memory effects require no externally supplied power.

Figure 3:
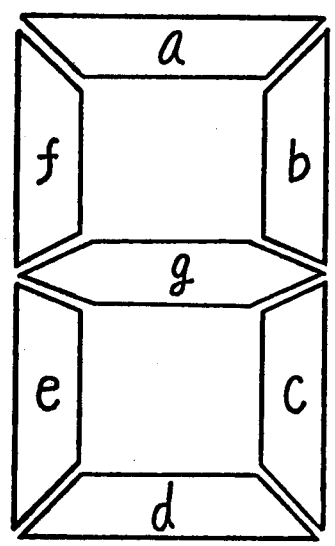
FIG. 3 is a layout of a typical seven-segment numeral display pattern.
Figure 4:
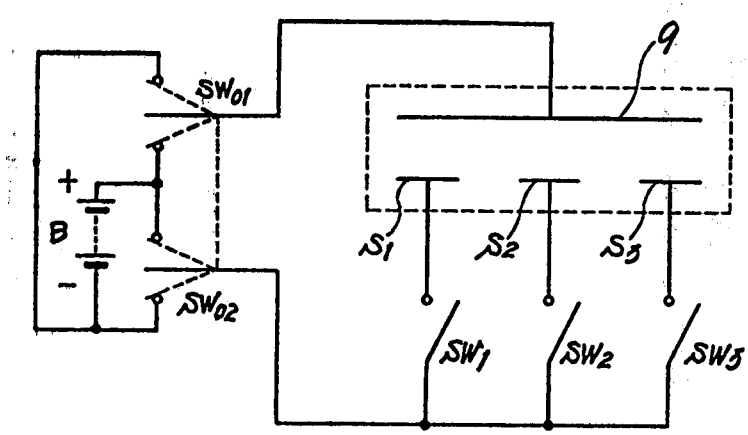
FIG. 4 is a circuit diagram of a typical driver circuit for an ECD.

By way of example, FIG. 4 illustrates a typical driver circuit for a seven-segment numeral display utilizing the above constructed ECD of which the font is depicted in FIG. 3. Only three segments $S_1$, $S_2$ and $S_3$ are illustrated in FIG. 4 for convenience sake. The driver circuit of FIG. 4 mainly comprises a power source B, polarity selection switches $SW_{01}$ and $SW_{02}$, the switches $SW_{01}$ and $SW_{02}$ being associated with each other, and segment switches $SW_1$, $SW_2$ and $SW_3$.

When only a specific segment $S_1$ is to be colored, the selection switches $SW_{01}$ and $SW_{02}$ are inclined toward the lower terminals, respectively, and only the segment switch $SW_1$ connected to the segment $S_1$ is closed. At this moment, the electric current flows from the counter electrode 9 to the segment electrode $S_1$ through the electrolyte, thereby coloring the segment $S_1$.

Once the segment $S_1$ is sufficiently colored, at least one of the selection switches $SW_{01}$ and $SW_{02}$ is maintained at the intermediate position to terminate the flow of the electric current. The segment $S_1$ is sustained in the coloration state. Alternatively, the segment $S_1$ is also placed in the memory condition when the segment switch $SW_1$ is opened even when the selection switches $SW_{01}$ and $SW_{02}$ are remained to incline toward the lower terminals. The coloration tone can be controlled by selectively varying the ON period of the respective segment switches $SW_1$, $SW_2$ and $SW_3$.

Thereafter, when the segment $S_1$ is to be bleached, the selection switches $SW_{01}$ and $SW_{02}$ are inclined toward the upper terminals, respectively, and only the segment switch $SW_1$ connected to the segment $S_1$ is closed. At this moment, the electric current flows from the segment electrode $S_1$ to the counter electrode 9 through the electrolyte, thereby bleaching the segment $S_1$. The degree of the bleaching is also controllable by varying the ON period of the segment switch $SW_1$.

The switches of FIG. 4 can be made of electronic switches such as transistor analogue switches.

As already discussed above, ECDs show memory effects, which require no externally supplied power. That is, the coloration state and the bleached state are maintained as long as ECDs are held in an electrically opened state. However, the memory period is not infinite and, therefore, a colored display electrode is gradually bleached and/or a bleached display electrode is gradually colored when a certain display pattern is held for a period longer than the memory period of ECDs.

Especially in a solid state ECD, wherein both of the display electrode and the counter electrode comprise the $WO_3$ film formed on the transparent electrode, the bleached display electrode is gradually colored even when the ECD is held in an electrically opened state. The inventors consider that such incompletion of the memory effects is caused by oxygen which remains in the electrolyte, and the electric current path created within the ECD cell. Moreover, when the driver circuit includes electronic switches, a leakage current flows through the electronic switches even when the electronic switches are in OFF states.

Figure 5:
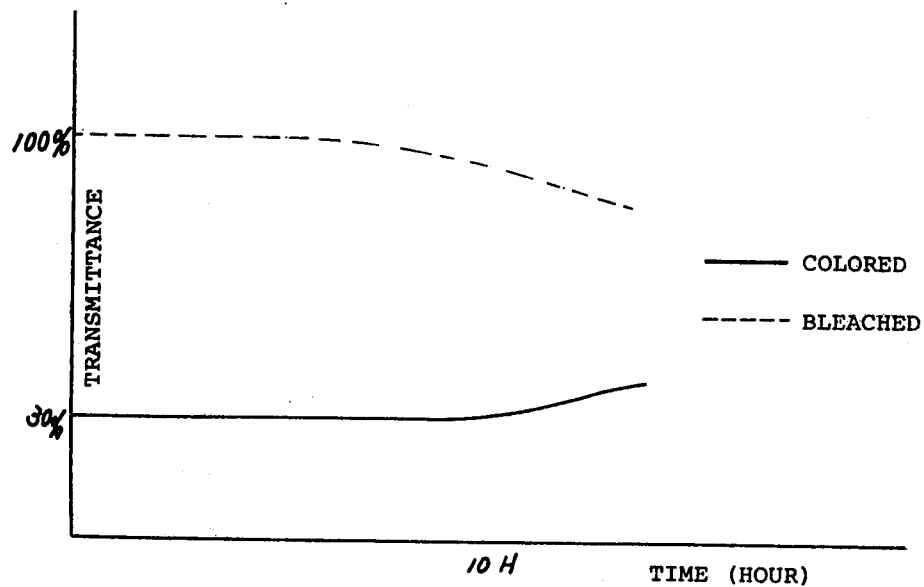
FIG. 5 is a graph showing variations of the transmittance in the memory state of an ECD.

FIG. 5 shows variations of the transmittance in the memory state of an ECD. It will be clear from the graph of FIG. 5 that the transmittance is gradually increased when ten (10) hours have passed at the colored display electrode. And the transmittance is gradually reduced when ten (10) hours have passed at the bleached display electrode.

The present invention is to provide a drive system which can compensate for the above-mentioned incompletion of the memory effects of ECDs.

Figure 6:
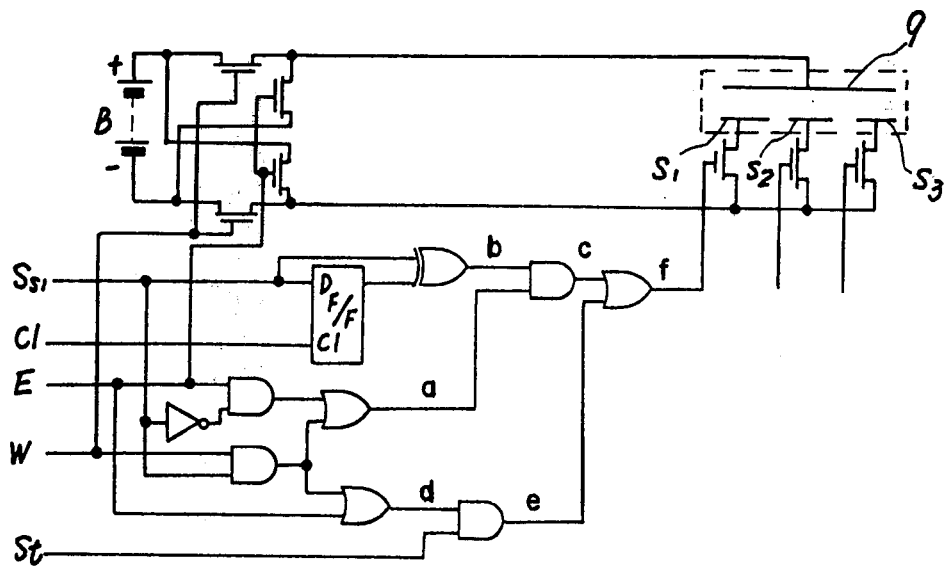
FIG. 6 is a circuit diagram of an embodiment of a drive system of the present invention.
Figure 7:
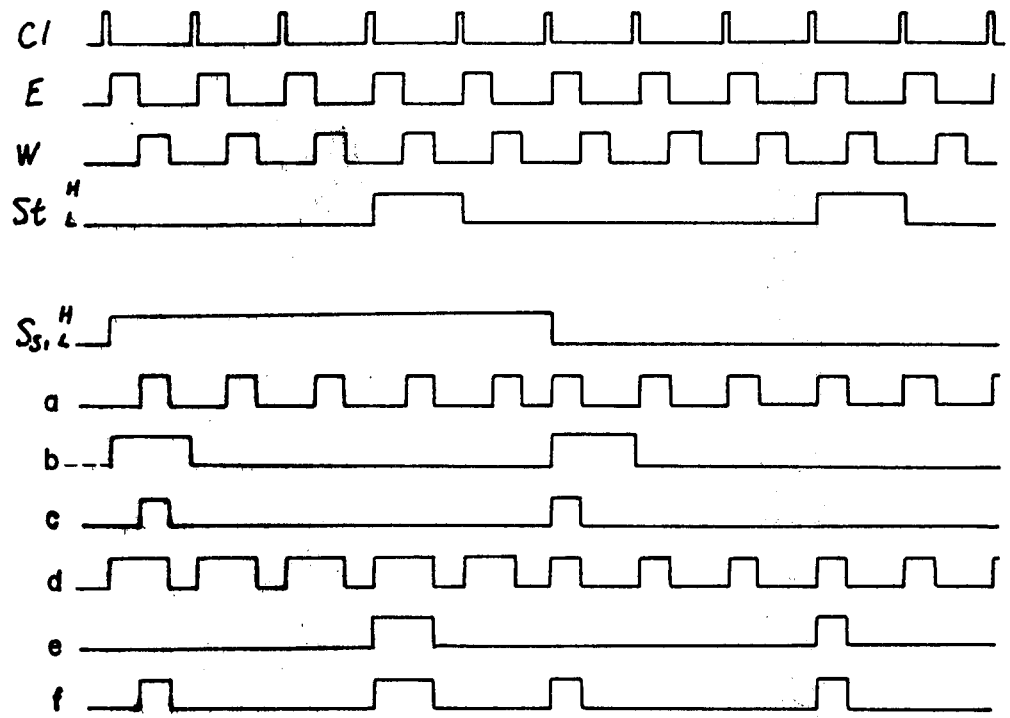
FIG. 7 is a time chart showing various signals occurring within the circuit of FIG. 6.

FIG. 6 shows an embodiment of a drive system of the present invention, wherein both of the colored display electrode and the bleached display electrode are regenerated when a certain display pattern is desired to be maintained for a time period longer than the memory period. Only one driver circuit connected to a segment electrode $S_1$ is illustrated in FIG. 6 for convenience sake. FIG. 7 shows various signals occurring within the circuit of FIG. 6.

A segment signal $S_{s1}$ takes the high level when the segment $S_1$ is in the coloration state and takes the low level when the segment $S_1$ is in the bleached state. A clock signal Cl is applied to a D-type flip-flop. The display pattern is changed at the trailing edge of the clock signal Cl. A bleaching, or, erase signal E, and a coloration, or, write signal W have pulse lengths sufficient to perform the bleaching operation and the coloration operation, respectively. A power source B provides the power required to perform the bleaching and coloration operations. The erase signal E and the write signal W function to select the polarity of the power supply in such a manner that the counter electrode 9 is made negative with respect to the segment electrodes when the erase signal E takes the high level and the counter electrode 9 is made positive with respect to the segment electrodes when the write signal W takes the high level. A strobe signal $S_t$ instructs the regeneration of the memory state. The frequency of the strobe signal $S_t$ is higher than that of the variations of the display pattern.

When the clock signal Cl, the erase signal E, the write signal W, the strobe signal $S_t$, and the segment signal $S_{sl}$ are applied as shown in FIG. 7, a connection wire c develops a signal corresponding to one erase pulse E or one write pulse W in response to the variation of the segment signal $S_{sl}$. That is, the erase pulse and the write pulse are applied to the ECD only when the segment selection signal $S_{sl}$ is changed, whereby the memory effects of the ECD are positively utilized to minimize the power dissipation.

A connection wire e develops a signal corresponding to one erase pulse plus one write pulse, or one erase pulse in response to the segment signal $S_{sl}$ when the strobe signal $S_t$ takes the high level. More specifically, when the segment signal $S_{sl}$ takes the high level, the erase pulse and the write pulse are developed so as to bleach the segment and, then, color the segment, thereby regenerating the memory state or enhancing the visibility. Contrarily, when the segment signal $S_{sl}$ takes the low level, only the erase pulse is developed to again bleach the segment.

The strobe signal $S_t$ is required only when the display quality is deteriorated because of long maintenance of a certain display pattern. In case where the ECD is applied to a digital display of an electronic timepiece, the strobe signal $S_t$ is desired to be applied to the display section of the hour information, but not to the display section of the minute information. More particularly, when the ECD has the characteristics as shown in FIG. 5, the strobe signal $S_t$ should be applied in a duration of ten (10) hours only to a display section where the display pattern is not changed for more than ten (10) hours.

Figure 8:
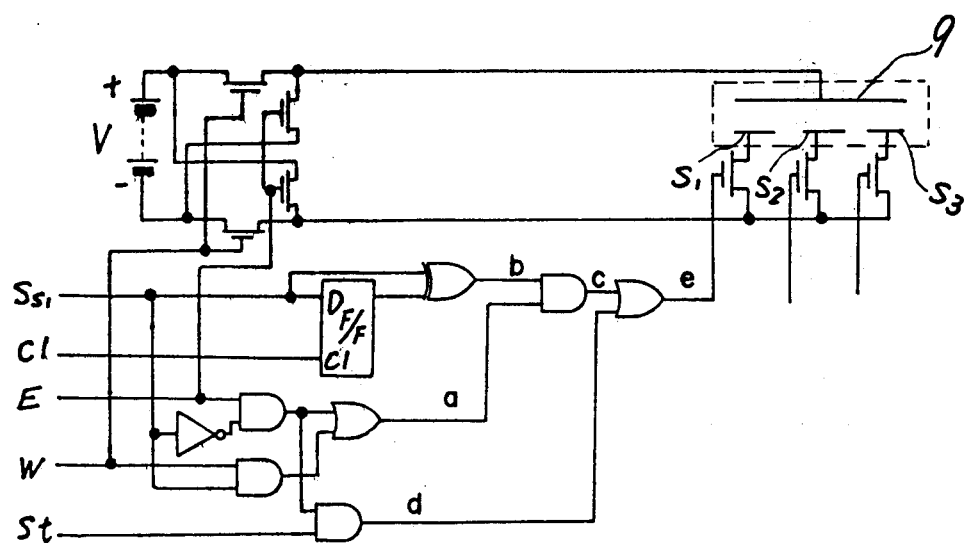
FIG. 8 is a circuit diagram of another embodiment of a drive system of the present invention.
Figure 9:
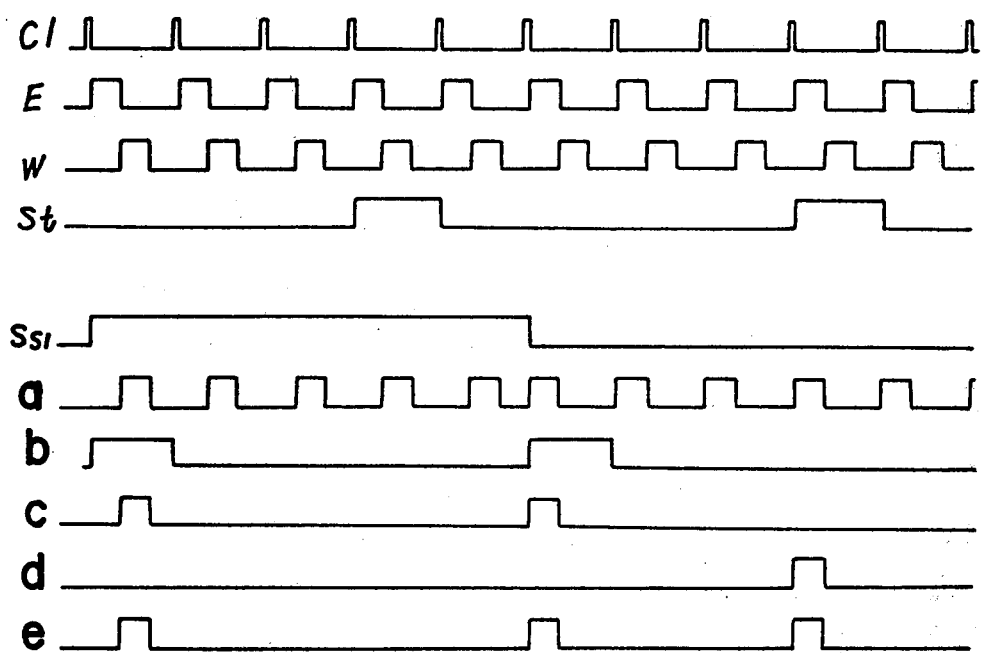
FIG. 9 is a time chart showing various signals occurring within the circuit of FIG. 8.

FIG. 8 shows another embodiment of the drive system of the present invention, wherein the regeneration is conducted only to a segment which is in the bleached state. This type of regeneration is very effective for the solid state ECD shown in FIG. 1, since slight coloration of a white segment is apparently recognized by viewers but slight bleaching of a colored segment is hardly recognized by viewers. FIG. 9 shows various signals occurring within the circuit of FIG. 8.

In the case where the segment signal $S_{sl}$ takes the high level, the regeneration pulse is not applied to the segment $S_1$ even when the strobe signal $S_t$ takes the high level. Contrarily, in the case where the segment signal $S_{sl}$ takes the low level, the bleached condition regeneration pulse is applied to the segment $S_1$ when the strobe signal $S_t$ takes the high level.

The strobe signal $S_t$ should be shaped in such a manner that the leading edge and the trailing edge appear when both of the erase signal E and the write signal W take the low level in order to stabilize the regeneration. The strobe signal $S_t$ can be automatically developed once an hour or several times a day, or developed in response to manual depression of a regeneration command switch (not shown).

The MOS analogue switches included within the circuits of FIGS. 6 and 8 are ON when the gate signal is HIGH, and are OFF when the gate signal is LOW.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A coloration regeneration drive system for an electrochromic display which includes an electrochromic material and display pattern electrodes, combinations of the display pattern electrodes defining different desired display patterns, said coloration regeneration drive system comprising:
   first means for developing an erase pulse for bleaching a display pattern electrode which has been placed in the coloration state;
   second means for developing a write pulse for coloring a display pattern electrode which has been bleached by said erase pulse; and
   control means for sequentially activating said first and second means so that the existing coloration state of a display pattern electrode is regenerated in such a manner that said display pattern electrode is first bleached by said first means and then again colored by said second means.

2. A regeneration drive system for an electrochromic display which includes an electrochromic material and display pattern electrodes, combinations of the display pattern electrodes defining different desired display patterns, said regeneration drive system comprising:
   means for developing an erase pulse;
   means for applying a said erase pulse to each display pattern electrode which has been placed in a bleached state; and
   means for precluding application of any signals to any other display electrode which has been placed in a coloration state.

* * * * *